United States Patent
Liu et al.

(10) Patent No.: US 11,521,091 B2
(45) Date of Patent: Dec. 6, 2022

(54) LEVERAGING CORRELATION ACROSS AGENTS FOR ENHANCED DISTRIBUTED MACHINE LEARNING

(71) Applicant: International Business Machines Corporation, Armonk, NY (US)

(72) Inventors: Changchang Liu, White Plains, NY (US); Shiqiang Wang, White Plains, NY (US); Wei-Han Lee, White Plains, NY (US); Seraphin Bernard Calo, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 868 days.

(21) Appl. No.: 16/419,315

(22) Filed: May 22, 2019

(65) Prior Publication Data

US 2020/0372380 A1 Nov. 26, 2020

(51) Int. Cl.
*G06N 5/04* (2006.01)
*G06K 9/62* (2022.01)
*G06N 20/00* (2019.01)

(52) U.S. Cl.
CPC .......... *G06N 5/043* (2013.01); *G06K 9/6218* (2013.01); *G06N 20/00* (2019.01)

(58) Field of Classification Search
None
See application file for complete search history.

(56) References Cited

U.S. PATENT DOCUMENTS

| 6,581,058 | B1 * | 6/2003 | Fayyad | G06F 16/30 |
| | | | | 707/E17.058 |
| 9,390,376 | B2 | 7/2016 | Harrison | |
| 9,436,917 | B2 * | 9/2016 | Mermoud | G06N 20/00 |
| 9,633,315 | B2 | 4/2017 | Chapelle | |
| 2018/0018590 | A1 | 1/2018 | Szeto | |
| 2019/0019104 | A1 | 1/2019 | Liu | |

FOREIGN PATENT DOCUMENTS

WO 20181620691 A1 9/2018

OTHER PUBLICATIONS

Verma et al., An Algorithm for Model Fusion for Distributed Learning, InGround/Air Multisensor Interoperability, Integration, and Networking for Persistent ISR IX May 4, 2018 (vol. 10635, pp. 168-175). SPIE, (Year: 2018).*

(Continued)

*Primary Examiner* — Tapas Mazumder
(74) *Attorney, Agent, or Firm* — Edward P. Li

(57) ABSTRACT

A computer-implemented method, a computer program product, and a computer system for enhanced distributed machine learning. A fusion server in a distributed machine learning system determines correlation relationships across agents in the distributed machine learning system, based on auxiliary information. The fusion server clusters the agents to form one or more communities, based on the correlation relationships. The fusion server selects, from the one or more communities, participating agents that participate in the enhanced distributed machine learning.

17 Claims, 5 Drawing Sheets

(56) References Cited

OTHER PUBLICATIONS

Bosse "Distributed Machine Learning with Self-Organizing Mobile Agents for Earthquake Monitoring" 2016 IEEE 1st International Workshops on Foundations and Applications of Self* Systems (FAS*W), Augsburg, 2016, pp. 126-132.

Mell et al., "The NIST Definition of Cloud Computing", National Institute of Standards and Technology, Special Publication 800-145, Sep. 2011, 7 pages.

Tozicka et al. "A framework for agent-based distributed machine learning and data mining" Proceedings of the 6th International joint conference on Autonomous agents and multiagent systems (AAMAS '07). ACM, New York, NY, USA, Article 96, 8 pages.

Tozicka et al. "Market-Inspired approach to collaborative learning" Proceedings of the 10th international conference on Cooperative Information Agents (CIA'06), Matthias Klusch, Michael Rovatsos, and Terry R. Payne (Eds.). Springer-Verlag, Berlin, Heidelberg, pp. 213-227.

* cited by examiner

LEVERAGING CORRELATION ACROSS AGENTS FOR ENHANCED DISTRIBUTED MACHINE LEARNING

This invention was made with government support under W911NF-16-3-0001 awarded by Army Research Office (ARO). The government has certain rights to this invention.

BACKGROUND

The present invention relates generally to distributed machine learning, and more particularly to leveraging correlation across agents for enhanced distributed machine learning.

Distributed machine learning aims to allocate a complicated learning process onto multiple agents, especially when the agents do not share with the fusion server because limited communication resources and data privacy issues are considered. These multiple agents participating in a distributed machine learning process are usually considered as independent to each other.

SUMMARY

In one aspect, a computer-implemented method for enhanced distributed machine learning is provided. The computer-implemented method includes determining, by a fusion server in a distributed machine learning system, correlation relationships across agents in the distributed machine learning system, based on auxiliary information. The computer-implemented method further includes clustering, by the fusion server, the agents to form one or more communities, based on the correlation relationships. The computer-implemented method further includes selecting from the one or more communities, by the fusion server, participating agents that participate in the enhanced distributed machine learning.

In another aspect, a computer program product for enhanced distributed machine learning is provided. The computer program product comprising one or more computer-readable tangible storage devices and program instructions stored on at least one of the one or more computer-readable tangible storage devices. The program instructions are executable to determine, by a fusion server in a distributed machine learning system, correlation relationships across agents in the distributed machine learning system, based on auxiliary information; cluster, by the fusion server, the agents to form one or more communities, based on the correlation relationships; and select from the one or more communities, by the fusion server, participating agents that participate in the enhanced distributed machine learning.

In yet another aspect, a computer system for enhanced distributed machine learning is provided. The computer system comprises one or more processors, one or more computer readable tangible storage devices, and program instructions stored on at least one of the one or more computer readable tangible storage devices for execution by at least one of the one or more processors. The program instructions are executable to determine, by a fusion server in a distributed machine learning system, correlation relationships across agents in the distributed machine learning system, based on auxiliary information. The program instructions are further executable to cluster, by the fusion server, the agents to form one or more communities, based on the correlation relationships. The program instructions are further executable to select from the one or more communities, by the fusion server, participating agents that participate in the enhanced distributed machine learning.

DETAILED DESCRIPTION

Embodiments of the present invention disclose an approach that aims to enhance overall distributed machine learning performance through selecting more effective and secure agents. The agents in a distributed machine learning system are correlated through various forms of relationships. The correlation relationships can be extracted from different auxiliary information including, for example, social, behavioral, and genetic interactions among users of agents. These correlation relationships can be leveraged to enhance the overall distributed learning performance by selecting more effective and secure agents.

Embodiments of the present invention disclose an approach of a fusion server selecting agents. The fusion server selects agents that participate in the distributed machine learning, based on the correlation relationships across the agents.

Figure 1:
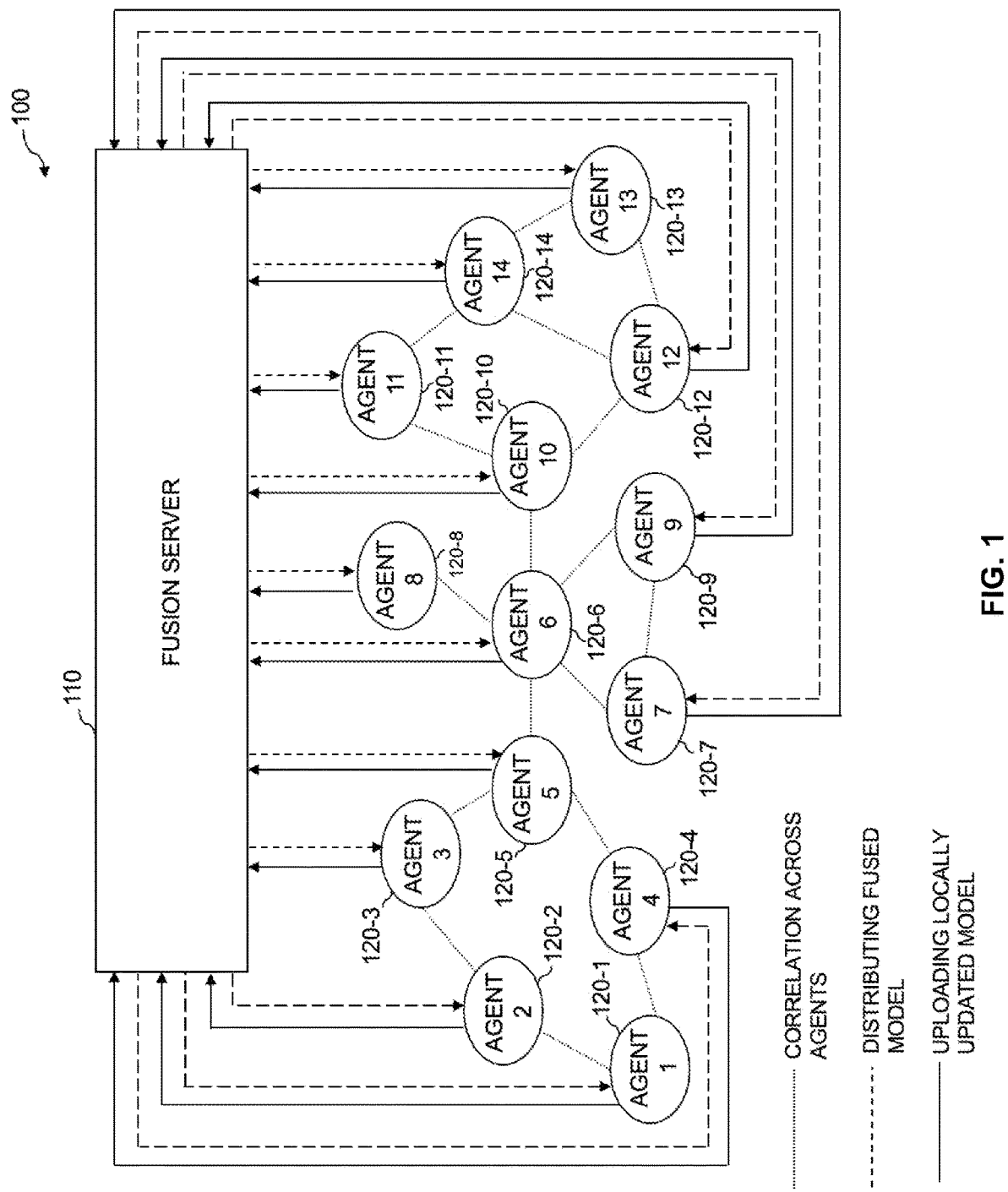
FIG. 1 is a systematic diagram illustrating a system of enhanced distributed machine learning, in accordance with one embodiment of the present invention.

FIG. 1 is a systematic diagram illustrating system 100 of enhanced distributed machine learning, in accordance with one embodiment of the present invention. System 100 includes fusion server 110 and a plurality of agents. As shown in FIG. 1, the agents include agent 1 (120-1), agent 2 (120-2), . . . , and agent 14 (120-14). FIG. 1 shows only an example of the plurality of the agents. It is understood that system 100 may have as many agents as needed. Each of agent 1 (120-1), agent 2 (120-2), . . . , and agent 14 (120-14) owns its local training dataset. Fusion server 110 fuses the information collected across all agent 1 (120-1), agent 2 (120-2), . . . , and agent 14 (120-14) and updates a training model.

Dot-lines among agent 1 (120-1), agent 2 (120-2), . . . , and agent 14 (120-14) represent correlation across the agents. FIG. 1 shows only an example of correlation across the agents. A dashed line between fusion server 110 and each agent represents distributing a fused model by fusion server 110 to each agent. A solid line between fusion server 110 and each agent represents uploading a locally updated model by each agent to fusion server 110.

In one embodiment, fusion server 110 may reside on a computing device. In another embodiment, fusion server 110 may reside on a virtual machine or another virtualization implementation. The virtual machine or the virtualization implementation runs on a computing device. The computing device is described in more detail in later paragraphs with reference to FIG. 3.

In one embodiment, a respective one of agent 1 (120-1), agent 2 (120-2), . . . , and agent 14 (120-14) may reside on a computing device. The computing device may be a desktop computer, a notebook, a laptop computer, a tablet computer, a handheld device, a smartphone, or any other electronic device or computing system capable of receiving input from a user, executing computer program instructions, and communicating with another computing system via a network. In another embodiment, a respective one of agent 1 (120-1), agent 2 (120-2), . . . , and agent 14 (120-14) may reside on a virtual machine or another virtualization implementation. The virtual machine or the virtualization implementation runs on a computing device. The computing device is described in more detail in later paragraphs with reference to FIG. 3.

System 100 of enhanced distributed machine learning may be implemented in a network that can be any combination of connections and protocols which support communications between fusion server 110 and each of agent 1 (120-1), agent 2 (120-2), . . . , and agent 14 (120-14). For example, the network may be the Internet which represents a worldwide collection of networks and gateways to support communications between devices connected to the Internet; the network may be implemented as an intranet, a local area network (LAN), or a wide area network (WAN). System 100 of enhanced distributed machine learning may be implemented in a cloud computing environment. The cloud computing environment is described in later paragraphs with reference to FIG. 4 and FIG. 5.

For a distributed machine learning system with N agents, each agent has access to a local training dataset. Fusion of local models updated by the agents follows the following steps of distributed machine learning. Step 1: Each agent contacts a fusion server to get hyperparameters for training. Note that the agents train a same model, such as neural networks. Step 2: Each agent trains the model on a local mini-batch of data and sends a weight to the fusion server. For instance, the model can be characterized by a local model vector $w_i$, for agent i; agent i sends a weight $p_i$ to the fusion server. Step 3: The fusion server computes a weighted average of the local models. An averaged model vector W can be calculated as:

$$W = \sum_{i=1}^{N} p_i w_i$$

Steps 2 and 3 are repeated until convergence.

In one embodiment, the fused model may be a coreset of all distributed datasets, and a fusion process is the distributed computation of coreset. In another embodiment, the fused model may be a machine learning model for a predefined machine learning task, and the fusion process is federated learning.

Fusion server 110 analyzes the correlation across agent 1 (120-1), agent 2 (120-2), . . . , and agent 14 (120-14). An example of the correlation among agent 1 (120-1), agent 2 (120-2), . . . , and agent 14 (120-14) are illustrated by the dot-lines in FIG. 1. Fusion server 110 determines the correlation relationships across agent 1 (120-1), agent 2 (120-2), . . . , and agent 14 (120-14), based on auxiliary information. The auxiliary information includes, for example, social, behavioral, and genetic interactions among users of agents. For example, resources for the auxiliary information includes but is not limited to social networks, mobility traces, business data, and medical records. The social networks directly describe the correlation among users of the agents. For example, if the users are friends in social networks, the agents are likely to own similar training data. The mobility traces can be leveraged to construct the correlation relationships across the agents, because correlated agents may share similar mobility traces for supporting distributed machine learning in mobility datasets. The business data of users of agents can be leveraged to construct the correlation relationships across the agents. If the users are more frequently involved in similar business transactions, the users may share similar business records. The medical records of users of agents can be leveraged to construct the correlation relationships across the agents, based on genetic correlation across the users or disease transmission networks. For example, if the users are relatives, the users are likely to share similar genetic data; if the users live closely, the users are likely to be transmitted the same disease.

In establishing the correlation relationships, other information, such as inherent similarity of training data belonging to different agents, may be used. Such information may be either computed internally by system 100 or obtained from external systems and data sources.

Based on the correlation relationships across agent 1 (120-1), agent 2 (120-2), . . . , and agent 14 (120-14), fusion server 110 clusters the agents to form one or more communities. From the one or more communities, fusion server 110 selects participating agents that participate in distributed machine learning. Selecting the participating agents is based on some considerations. Examples of the considerations are as follows. (1) Construct more balanced training datasets. It is likely that participating agents within a same community have more similar training datasets than agents from other communities. In order to avoid redundancy and reduce bias, the fusion server randomly selects the participating agents from each community to construct balanced training datasets. (2) For a scenario where the communication resources are limited, the fusion server may only be able to select a limited number of agents. If the computational capability of each agent is known, the fusion server may leverage existing optimization strategies to select the most efficient set of agents from each community and achieve the best learning performance within a limited overhead of communication cost. (3) Select more reliable training datasets. For a scenario where certain poisoning attacks may exist, a fraction of training datasets of some agents may be contaminated. It is likely that the training datasets of other agents that locate within a same community or neighboring community may also be contaminated. It is thus more robust to select agents from other communities to avoid security and privacy issues.

In one embodiment, the selection of the agents participating in the distributed machine learning is done once before iterations of machine learning steps. The fusion server selects agents at the beginning of a training phase and the selected agents participate in the whole training phase afterwards until convergence.

The fusion server may dynamically select agents participating in the distributed machine learning. In an embodiment, the selection of the agents that participate in the distributed machine learning may be done at each of the iterations. The fusion server selects the agents at each iteration in the whole training phase. In another embodiment, the selection of the agents that participate in the distributed machine learning may be done at an interval of a predetermined numbers of iterations. In yet another embodiment, the selection of the agents that participate in the distributed machine learning may be dynamically done based on whether the auxiliary information changes during the machine learning steps. During the training phase, if the fusion server determines that the auxiliary information of some agents changes such that a new set of agents is needed to be selected to participate in the distributed machine learning, the fusion server stops using these agents and re-selects agents that participate in the distributed machine learning. In yet another embodiment, the fusion server determines whether some agents are contaminated (for example, these agents are attacked); if these agents are contaminated, the fusion server stops using these agents and select a new set of agents that participate in the distributed machine learning. The fusion server adjusts agents selected to participate in the distributed machine learning to allow more flexibility and accommodate temporal dynamics.

Fusion server 110 distributes a fused model to the participating agents, such as agent 1 (120-1), agent 2 (120-2), . . . , and agent 14 (120-14). The dashed lines shown in FIG. 1 show fusion server 110 distributing the fused model to respective ones of agent 1 (120-1), agent 2 (120-2), . . . , and agent 14 (120-14). Note that the initial fused model is random. Based on the fused model, each of the participating agents computes a model update step (such as a gradient of a model-specific loss function) over its local training dataset. Then, each of the participating agents uploads the model update step (or locally updated model) to fusion serve 110. The solid lines shown in FIG. 1 show agent 1 (120-1), agent 2 (120-2), . . . , and agent 14 (120-14) uploading respective locally updated models to fusion server 110. Fusion server 110 combines the model update steps respectively transmitted from the participating agents and generates an updated fused model. Fusion server 110 determines whether a difference between models learned in consecutive iterations becomes negligible. In response to models learned in consecutive iterations becoming negligible, fusion server 110 completes the distributed machine learning. In response to models learned in consecutive iterations being not negligible, fusion server 110 iterates the machine learning steps.

Figure 2:
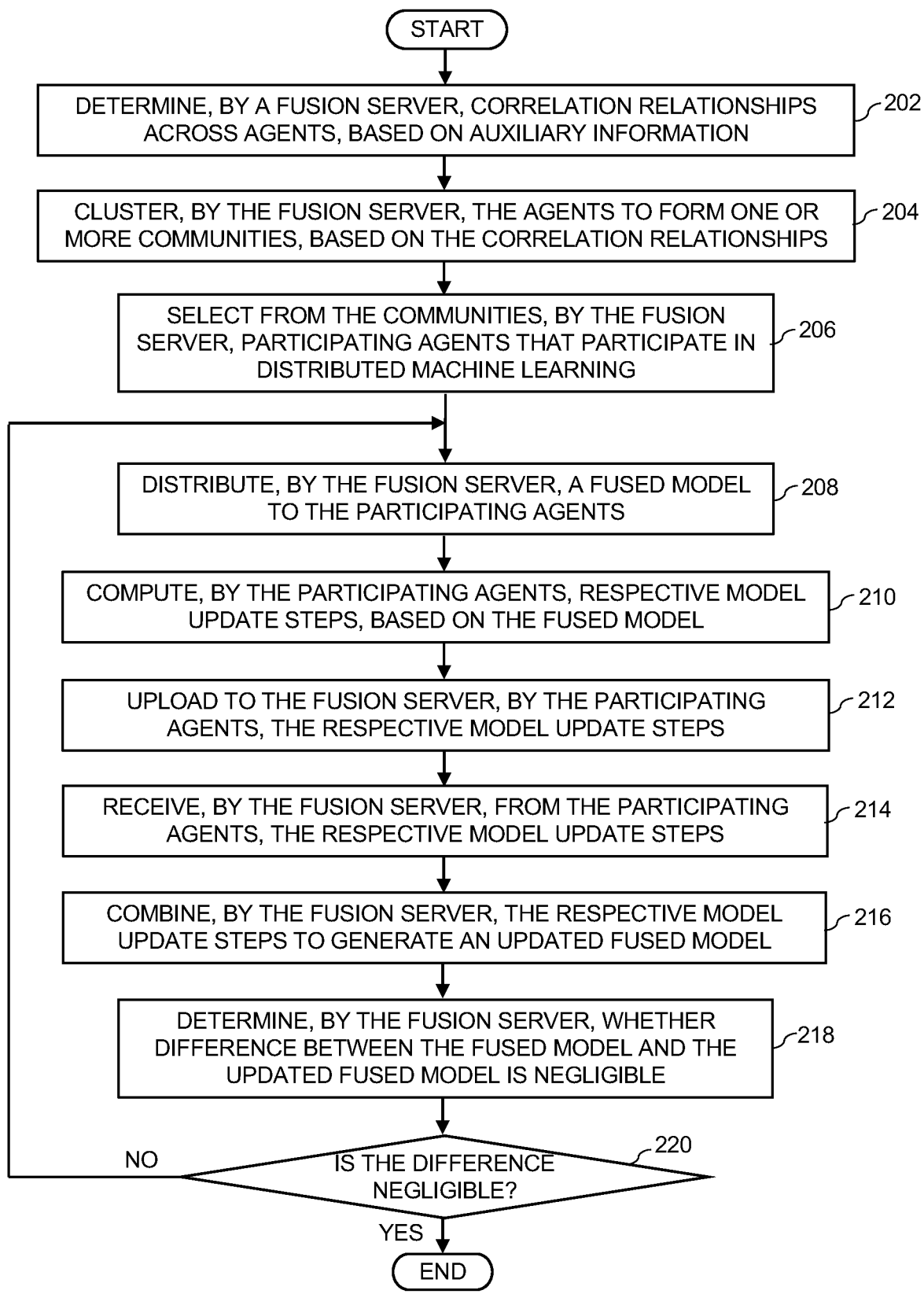
FIG. 2 presents a flowchart showing operational steps of leveraging correlation across agents for enhanced distributed machine learning, in accordance with one embodiment of the present invention.

FIG. 2 presents a flowchart showing operational steps of leveraging correlation across agents for enhanced distributed machine learning, in accordance with one embodiment of the present invention. At step 202, a fusion server (e.g., fusion server 110 shown in FIG. 1) determines correlation relationships across agents (e.g., agent 1 120-1, agent 2 120-2, . . . , and agent 14 120-14 shown in FIG. 1), based on auxiliary information. The auxiliary information includes, for example, social, behavioral, and genetic interactions among users of the agents. The auxiliary information has been described in detail in a previous paragraph of this document.

At step 204, the fusion server clusters the agents to form one or more communities, based on the correlation relationships. At step 206, the fusion server selects, from the communities, participating agents that participate in distributed machine learning. The fusion server determines the participating agents such that more balanced training datasets are constructed. Agents within a same community have more similar training datasets than agents from other communities; therefore, the fusion server randomly selects the participating agents from each community to construct more balanced training datasets. The fusion server determines the participating agents such that the best learning performance within a limited overhead of communication cost can be achieved. The fusion server determines the participating agents such that more reliable training datasets are selected to avoid security and privacy issues. In one embodiment, the fusion server may select the participating agents once before iterations of the machine learning steps; the fusion server runs step 206 once and then iterates steps 208-220 without repeating step 206. In an embodiment of dynamic selection, the fusion server may select the participating agents at each of the iterations of machine learning steps; the fusion server iterates steps 206-220. In another embodiment of dynamic selection, the fusion server may select the participating agents at an interval of a predetermined numbers of iterations of machine learning steps; the fusion server repeats step 206 after a predetermined number of iterations of steps 208-220. In yet another embodiment of dynamic selection, the fusion server may select the participating agents dynamically based on whether the auxiliary information changes during the machine learning steps. The fusion server determines whether the auxiliary information changes such that a new set of agents is needed to be selected to participate in the distributed machine learning. If the new set of agents is needed to be selected, the fusion server selects the new set of agents, before a next iteration of the machine learning steps (steps 208-220). In yet another embodiment of dynamic selection, if the fusion server determines that some agents are contaminated (for example, these agents are attacked), the fusion server stops using these agents and selects a new set of agents that participate in the distributed machine learning, before a next iteration of the machine learning steps (steps 208-220).

At step 208, the fusion server distributes a fused model to the participating agents. As shown in FIG. 1, dashed lines represent distributing a fused model from fusion server 110 to agent 1 120-1, agent 2 120-2, . . . , and agent 14 120-14. At step 210, the participating agents computes respective model update steps, based on the fused model. Each of the participating agents compute a model update step (such as a gradient of a model-specific loss function) over its local training dataset. Then, at step 212, the participating agents upload the respective model update steps to the fusion server. As shown in FIG. 1, solid lines represent the respective model update steps (uploading locally updated models) from agent 1 120-1, agent 2 120-2, . . . , and agent 14 120-14 to fusion server 110.

At step 214, the fusion server receives, from the participating agents, the respective model update steps. At step 216, the fusion server combines the respective model update steps to generate an updated fused model. At step 218, the fusion server determines whether difference between the fused model and the updated fused model is negligible. In response to the difference between the fused model and the updated fused model being negligible (YES branch of decision block 220), the fusion server completes iterations of machine learning steps. In response to the difference between the fused model and the updated fused model being not negligible (NO branch of decision block 220), the fusion server runs a next iteration of machine learning steps 208-220.

In one embodiment, after one or more iterations of learning steps 208-220, the fusion server may determine whether the auxiliary information changes such that a new set of agents is needed to be selected to participate in the enhanced distributed machine learning. In response to the new set of agents being needed to be selected, the fusion server runs step 206 before a next iteration of learning steps 208-220. In another embodiment, the fusion server may determine whether some agents are contaminated (for example, these agents are attacked). In response to some agents being contaminated, the fusion server runs step 206 before a next iteration of learning steps 208-220.

Figure 3:
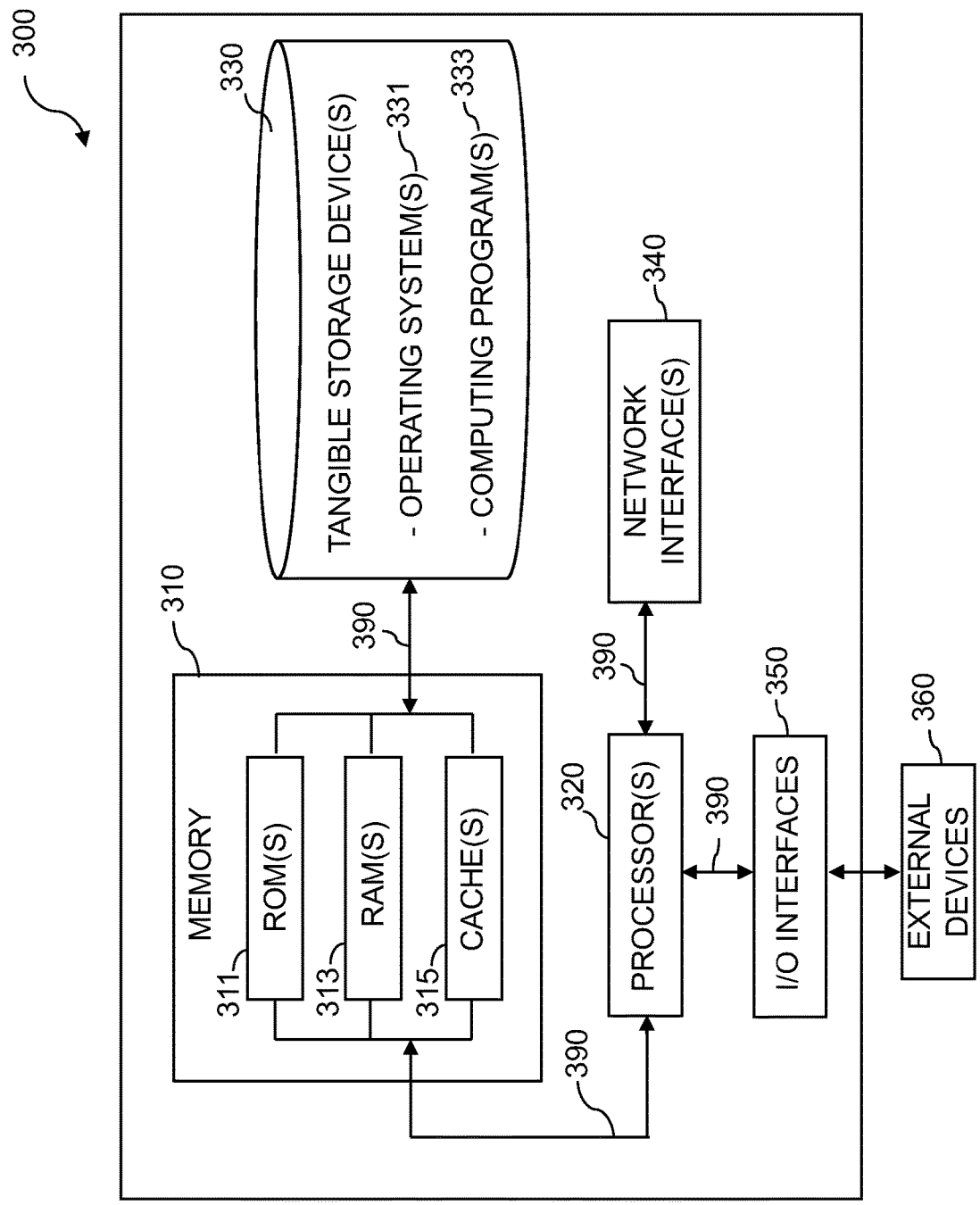
FIG. 3 is a diagram illustrating components of a computing device, in accordance with one embodiment of the present invention.

FIG. 3 is a diagram illustrating components of computing device 300, in accordance with one embodiment of the present invention. It should be appreciated that FIG. 3 provides only an illustration of one implementation and does not imply any limitations with regard to the environment in which different embodiments may be implemented.

Referring to FIG. 3, computing device 300 includes processor(s) 320, memory 310, and tangible storage device(s) 330. In FIG. 3, communications among the above-mentioned components of computing device 300 are denoted by numeral 390. Memory 310 includes ROM(s) (Read Only Memory) 311, RAM(s) (Random Access Memory) 313, and cache(s) 315. One or more operating systems 331 and one or more computer programs 333 reside on one or more computer readable tangible storage device(s) 330.

Computing device 300 further includes I/O interface(s) 350. I/O interface(s) 350 allows for input and output of data with external device(s) 360 that may be connected to computing device 300. Computing device 300 further includes network interface(s) 340 for communications between computing device 300 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the C programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
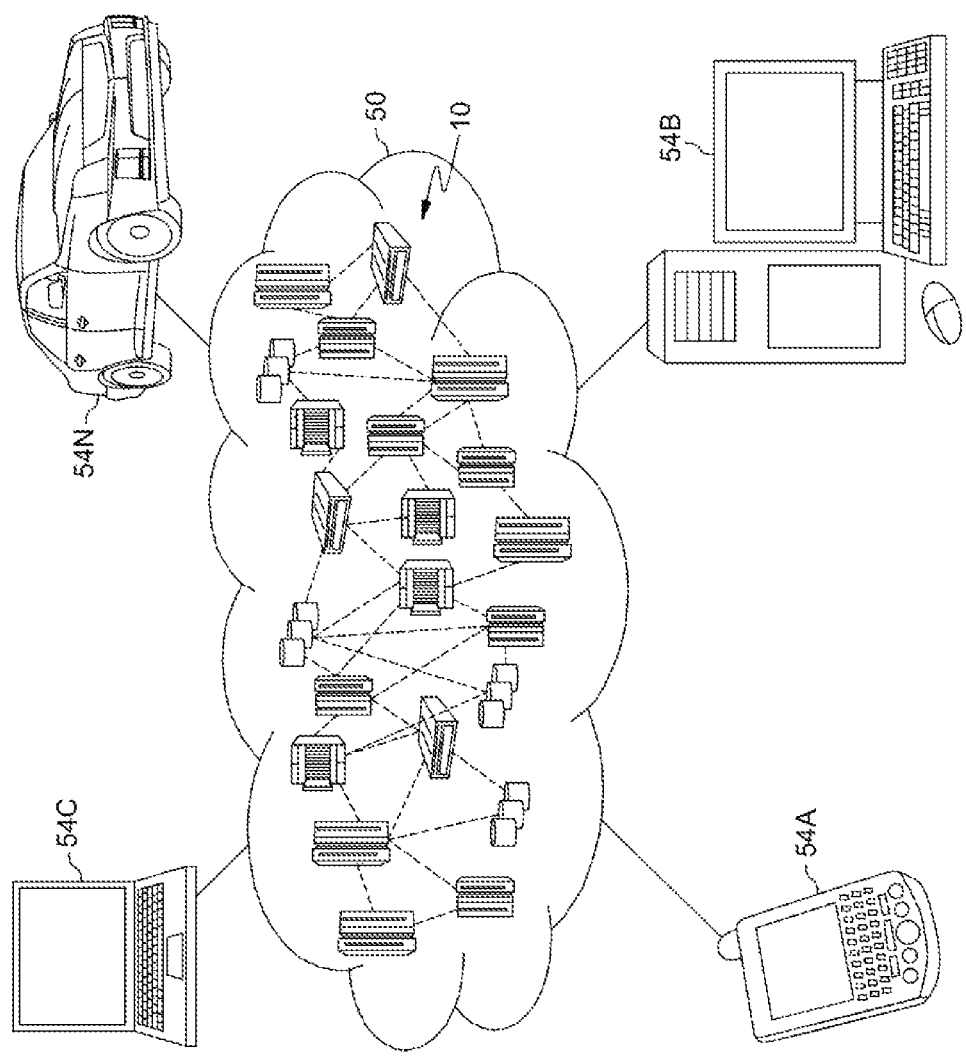
FIG. 4 depicts a cloud computing environment, in accordance with one embodiment of the present invention.

Referring now to FIG. 4, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 5:
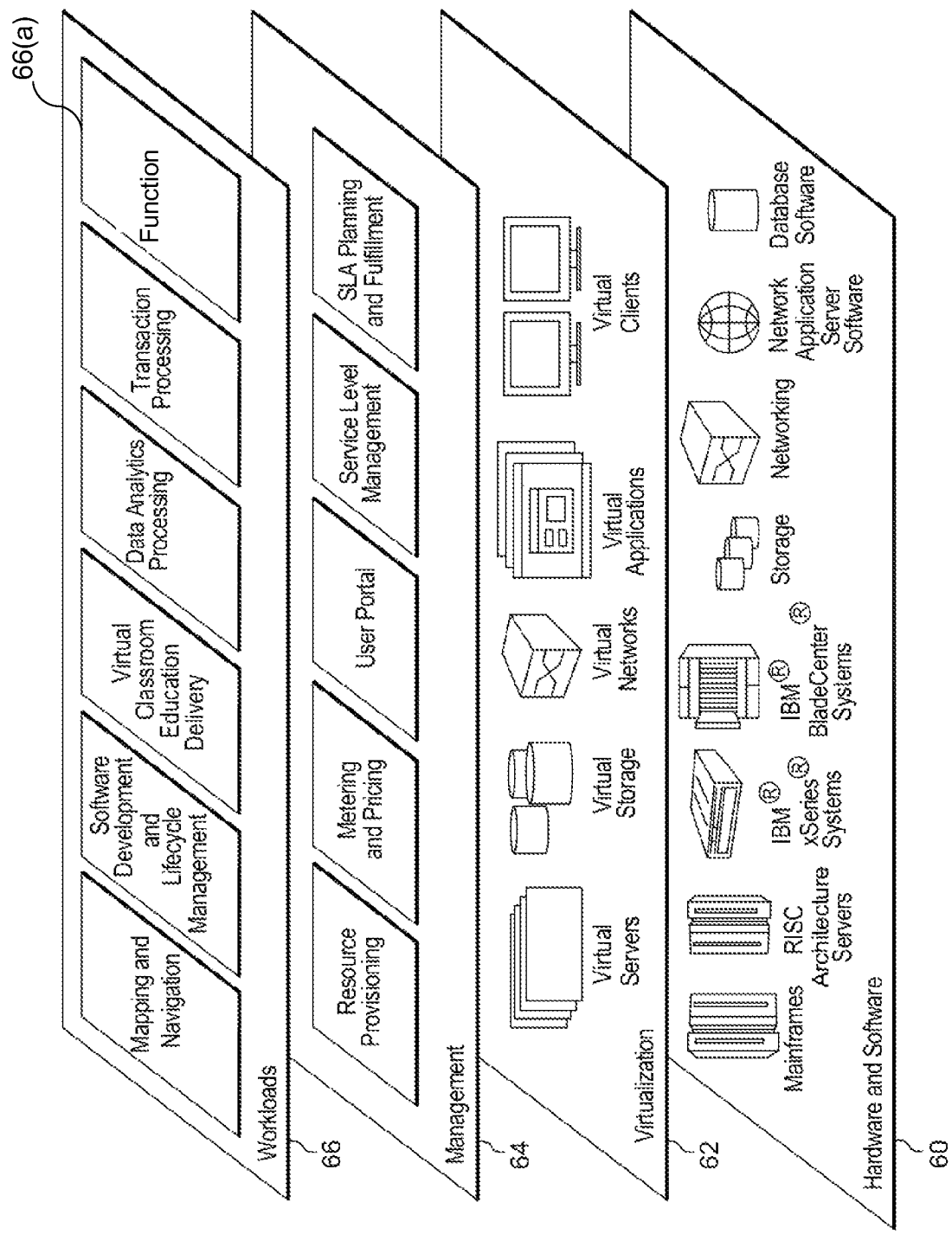
FIG. 5 depicts abstraction model layers in a cloud computing environment, in accordance with one embodiment of the present invention.

Referring now to FIG. 5, a set of functional abstraction layers provided by cloud computing environment 50 (shown FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes, RISC (Reduced Instruction Set Computer) architecture based servers, servers, blade servers, storage devices, and networks and networking components. In some embodiments, software components include network application server software and database software.

Virtualization layer 62 provides an abstraction layer from which the following examples of virtual entities may be provided: virtual servers, virtual storage, virtual networks, including virtual private networks, virtual applications and operating systems, and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User Portal provides access to the cloud computing environment for consumers and system administrators. Service Level Management provides cloud computing resource allocation and management such that required service levels are met. Service Level Agreement (SLA) Planning and Fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: Mapping and Navigation, Software Development and Lifecycle Management, Virtual Classroom Education Delivery, Data Analytics Processing, Transaction Processing, and functionality according to the present invention (Function 66a). In embodiments of the present invention, function 66a is the functionality of fusion server 110 or agent 1 (120-1), agent 2 (120-2), ..., and agent 14 (120-14) shown in FIG. 1 in a cloud computing environment.

What is claimed is:

1. A computer-implemented method for enhanced distributed machine learning, the method comprising:
   determining, by a fusion server in a distributed machine learning system, correlation relationships across agents in the distributed machine learning system, based on auxiliary information;
   clustering, by the fusion server, the agents to form one or more communities, based on the correlation relationships;
   selecting from the one or more communities, by the fusion server, participating agents that participate in the enhanced distributed machine learning; and
   wherein the fusion server selects the participating agents at an interval of a predetermined number of iterations of machine learning steps.

2. The computer-implemented method of claim 1, wherein the auxiliary information comprises at least one of social, behavioral, and genetic interactions among users of the agents.

3. The computer-implemented method of claim 1, further comprising:
   distributing, by the fusion server, a fused model to the participating agents;
   computing, by the participating agents, respective model update steps, based on the fused model;
   uploading to the fusion server, by the participating agents, the respective model update steps;
   receiving, by the fusion server, from the participating agents, the respective model update steps;
   combining, by the fusion server, the respective model update steps to generate an updated fused model;
   determining, by the fusion server, whether difference between the fused model and the updated fused model is negligible; and
   in response to the difference between the fused model and the updated fused model being not negligible, iterating, by the fusion server, machine learning steps until convergence.

4. The computer-implemented method of claim 3, further comprising:
   determining, by the fusion server, whether the auxiliary information changes such that a new set of agents is needed to be selected to participate in the enhanced distributed machine learning; and
   in response to the new set of agents being needed to be selected, selecting, by the fusion server, the new set of agents, before a next iteration of the machine learning steps.

5. The computer-implemented method of claim 1, wherein the fusion server selects the participating agents such that more balanced training datasets are constructed, wherein the fusion server selects the participating agents such that best learning performance within a limited overhead of communication cost is achieved, wherein the fusion server selects the participating agents such that more reliable training datasets are selected to avoid security and privacy issues.

6. The computer-implemented method of claim 1, wherein the fusion server selects the participating agents once before iterations of machine learning steps and the participating agents are used in all of the iterations.

7. A computer program product for enhanced distributed machine learning, the computer program product comprising one or more computer-readable tangible storage devices and program instructions stored on at least one of the one or more computer-readable tangible storage devices, the program instructions executable to:
   determine, by a fusion server in a distributed machine learning system, correlation relationships across agents in the distributed machine learning system, based on auxiliary information;
   cluster, by the fusion server, the agents to form one or more communities, based on the correlation relationships;

select from the one or more communities, by the fusion server, participating agents that participate in the enhanced distributed machine learning; and wherein the fusion server selects the participating agents at an interval of a predetermined number of iterations of machine learning steps.

8. The computer program product of claim 7, wherein the auxiliary information comprises at least one of social, behavioral, and genetic interactions among users of the agents.

9. The computer program product of claim 7, further comprising the program instructions executable to:

distribute, by the fusion server, a fused model to the participating agents;

compute, by the participating agents, respective model update steps, based on the fused model;

upload to the fusion server, by the participating agents, the respective model update steps;

receive, by the fusion server, from the participating agents, the respective model update steps;

combine, by the fusion server, the respective model update steps to generate an updated fused model;

determine, by the fusion server, whether difference between the fused model and the updated fused model is negligible; and in response to the difference between the fused model and the updated fused model being not negligible, iterate, by the fusion server, machine learning steps until convergence.

10. The computer program product of claim 9, further comprising the program instructions executable to:

determine, by the fusion server, whether the auxiliary information changes such that a new set of agents is needed to be selected to participate in the enhanced distributed machine learning; and in response to the new set of agents being needed to be selected, select, by the fusion server, the new set of agents, before a next iteration of the machine learning steps.

11. The computer program product of claim 7, wherein the fusion server selects the participating agents such that more balanced training datasets are constructed, wherein the fusion server selects the participating agents such that best learning performance within a limited overhead of communication cost is achieved, wherein the fusion server selects the participating agents such that more reliable training datasets are selected to avoid security and privacy issues.

12. The computer program product of claim 7, wherein the fusion server selects the participating agents once before iterations of machine learning steps and the participating agents are used in all of the iterations.

13. A computer system for enhanced distributed machine learning, the computer system comprising:

one or more processors, one or more computer readable tangible storage devices, and program instructions stored on at least one of the one or more computer readable tangible storage devices for execution by at least one of the one or more processors, the program instructions executable to:

determine, by a fusion server in a distributed machine learning system, correlation relationships across agents in the distributed machine learning system, based on auxiliary information;

cluster, by the fusion server, the agents to form one or more communities, based on the correlation relationships;

select form the one or more communities, by the fusion server, participating agents that participate in the enhanced distributed machine learning; and wherein the fusion server selects the participating agents at an interval of a predetermined number of iterations of machine learning steps.

14. The computer system of claim 13, wherein the auxiliary information comprises at least one of social, behavioral, and genetic interactions among users of the agents, wherein the fusion server selects the participating agents such that more balanced training datasets are constructed, wherein the fusion server selects the participating agents such that best learning performance within a limited overhead of communication cost is achieved, wherein the fusion server selects the participating agents such that more reliable training datasets are selected to avoid security and privacy issues.

15. The computer system of claim 13, further comprising the program instructions executable to:

distribute, by the fusion server, a fused model to the participating agents;

compute, by the participating agents, respective model update steps, based on the fused model;

upload to the fusion server, by the participating agents, the respective model update steps;

receive, by the fusion server, from the participating agents, the respective model update steps;

combine, by the fusion server, the respective model update steps to generate an updated fused model;

determine, by the fusion server, whether difference between the fused model and the updated fused model is negligible; and in response to the difference between the fused model and the updated fused model being not negligible, iterate, by the fusion server, machine learning steps until convergence.

16. The computer system of claim 15, further comprising the program instructions executable to:

determine, by the fusion server, whether the auxiliary information changes such that a new set of agents is needed to be selected to participate in the enhanced distributed machine learning; and in response to the new set of agents being needed to be selected, select, by the fusion server, the new set of agents, before a next iteration of the machine learning steps.

17. The computer system of claim 13, wherein the fusion server selects the participating agents once before iterations of machine learning steps and the participating agents are used in all of the iterations.

* * * * *